(12) United States Patent
Vecera et al.

(10) Patent No.: US 11,270,058 B2
(45) Date of Patent: Mar. 8, 2022

(54) REFERENCING A PORTION OF A DOCUMENT

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 591 days.

(21) Appl. No.: 13/688,686

(22) Filed: Nov. 29, 2012

(65) Prior Publication Data
US 2014/0149858 A1 May 29, 2014

(51) Int. Cl.
*G06F 17/21* (2006.01)
*G06F 17/30* (2006.01)
*G06F 40/103* (2020.01)
*G06F 16/955* (2019.01)

(52) U.S. Cl.
CPC ........ *G06F 40/103* (2020.01); *G06F 16/9562* (2019.01)

(58) Field of Classification Search
CPC ............. G06F 17/211; G06F 17/30884; G06F 40/103; G06F 16/9562
USPC ........................................................ 715/273
See application file for complete search history.

(56) References Cited

U.S. PATENT DOCUMENTS

| | | | | |
|---|---|---|---|---|
| 5,524,201 A * | 6/1996 | Shwarts | ................ | G06F 16/40 715/763 |
| 5,781,785 A * | 7/1998 | Rowe | .................... | G06F 40/149 715/234 |
| 5,801,702 A * | 9/1998 | Dolan | .................... | G06F 16/748 715/854 |
| 5,832,474 A * | 11/1998 | Lopresti | .................. | G06F 16/93 |
| 6,041,335 A * | 3/2000 | Merritt | .................. | G06F 40/106 715/203 |
| 6,122,647 A * | 9/2000 | Horowitz | .............. | G06F 16/954 715/205 |
| 6,184,886 B1 * | 2/2001 | Bates | .................. | G06F 16/9562 715/760 |
| 6,219,679 B1 * | 4/2001 | Brisebois | ............ | G06F 16/9562 715/206 |
| 6,405,222 B1 * | 6/2002 | Kunzinger | .......... | G06F 16/9562 715/205 |
| 7,739,622 B2 * | 6/2010 | DeLine | ............... | G06F 3/04855 715/835 |

(Continued)

OTHER PUBLICATIONS

AMA Citation Style, Rev Nov. 1, 2012 published Nov. 1, 2012 (http://www.lib.jmu.edu/citation/amaguide.pdf).*

*Primary Examiner* — William L Bashore
*Assistant Examiner* — David Faber
(74) *Attorney, Agent, or Firm* — Lowenstein Sandler LLP

(57) ABSTRACT

A mechanism for referencing a portion of a document. A method includes identifying, by a processing device of a user device, a portion of a document, the portion selected by a user of the user device. The method also includes displaying, by the processing device, the selected portion of the document as a graphical representation of an icon on the user device. The method also includes detecting, by the processing device, a reference to the icon displaying the selected portion of the document, the reference performed by the user. The method further includes providing, by the processing device, the referenced selected portion of the document associated with the icon to the user.

20 Claims, 8 Drawing Sheets

(56) References Cited

U.S. PATENT DOCUMENTS

| | | | | |
|---|---|---|---|---|
| 8,484,548 B1* | 7/2013 | Zhu | G06F 16/951 | 715/206 |
| 8,913,076 B1* | 12/2014 | Aggarwal | G09G 5/14 | 345/593 |
| 9,442,516 B2* | 9/2016 | Migos | G06F 3/0485 | |
| 9,544,653 B2* | 1/2017 | Kim | H04N 21/2362 | |
| 2004/0205543 A1* | 10/2004 | Awada | G06F 16/9562 | 715/205 |
| 2004/0236774 A1* | 11/2004 | Baird | G06F 17/241 | |
| 2006/0101341 A1* | 5/2006 | Kelly | G06F 3/04812 | 715/738 |
| 2007/0061755 A1* | 3/2007 | Taboada | G06F 3/0481 | 715/818 |
| 2007/0192729 A1* | 8/2007 | Downs | G06F 3/04855 | 715/786 |
| 2007/0300143 A1* | 12/2007 | Vanderport et al. | 715/500 | |
| 2008/0059906 A1* | 3/2008 | Toki | G11B 27/34 | 715/810 |
| 2008/0082905 A1* | 4/2008 | Martinez | G06F 16/954 | 715/205 |
| 2008/0104535 A1* | 5/2008 | DeLine | G06F 3/0483 | 715/785 |
| 2008/0235563 A1* | 9/2008 | Nakamura | G06F 3/0483 | 715/200 |
| 2008/0313722 A1* | 12/2008 | Cho | G06F 16/9562 | 726/7 |
| 2009/0199106 A1* | 8/2009 | Jonsson | G06F 16/9562 | 715/744 |
| 2011/0022528 A1* | 1/2011 | Hennessy | G06Q 10/10 | 705/319 |
| 2011/0238646 A1* | 9/2011 | Chamberlain | G06Q 30/02 | 707/706 |
| 2011/0320976 A1* | 12/2011 | Piersol | G06F 3/0488 | 715/810 |
| 2012/0072819 A1* | 3/2012 | Lindner | G06F 40/166 | 715/211 |
| 2012/0084704 A1* | 4/2012 | Lee | G06F 3/017 | 715/776 |
| 2013/0151958 A1* | 6/2013 | Muto | G06F 3/0482 | 715/273 |
| 2013/0263044 A1* | 10/2013 | MacLaurin | G06F 3/04855 | 715/786 |
| 2014/0053066 A1* | 2/2014 | Imamura | G06F 3/0485 | 715/251 |
| 2015/0074530 A1* | 3/2015 | Kim | G06F 3/0481 | 715/716 |

* cited by examiner

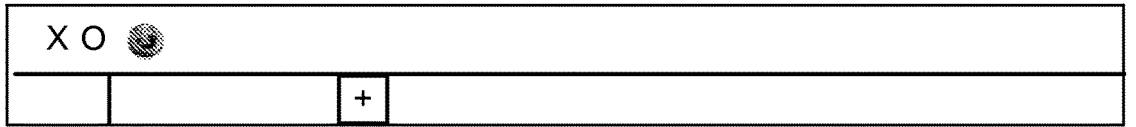

The problem is defined on this webpage (which contains several world records too).

2.5. The Traveling Tournament Problem (TTP) example

2.5.1. Problem statement

Schedule matches between N teams with the following hard constraints:

Each team plays twice against every other team: once home and once away.

Each team has exactly 1 match on each timeslot.

No team must have more than 3 consecutive home or 3 consecutive away matches.

No repeaters: no 2 consecutive matches of the same 2 opposing teams.

and the following soft constraint:

Minimize the total distance traveled by all teams.

The problem is defined on this webpage (which contains several world records too).

2.5.2 Simple and Smart Implementation

There are 2 implementations (simple and smart) to demonstrate the importance of some performance tips. The DroolsPlannerExamplesApp always runs the smart implementation, but with these commands you can compare the 2 implementations yourself:

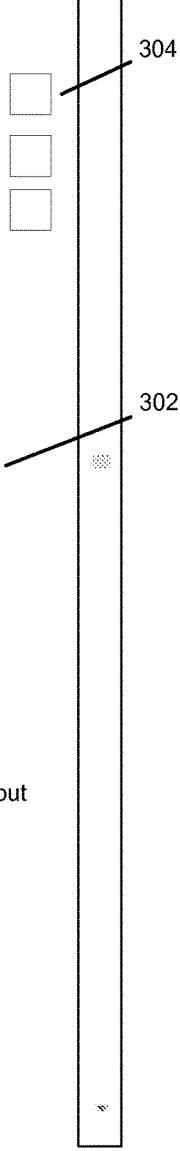

Figure 3A 2.5.2 Simple and Smart Implementation

There are 2 implementations (simple and smart) to demonstrate the importance of some performan    ps.
The DroolsPlannerExamplesApp always runs the smart implementation, but with these commands    can
compare the 2 implementations yourself:

REFERENCING A PORTION OF A DOCUMENT

TECHNICAL FIELD

The embodiments of the disclosure relate generally to a computer system and, more specifically, relate to mechanism for referencing a portion of a document.

BACKGROUND

When a user works (e.g. reads, writes and/or updates) on a document on the user's computing device, it is sometimes useful to have a portion of the document as a reference easily accessible as the user continues to work on the rest of the document.

Currently, the user needs to scroll back and forth in the document in order to reference the portion of the document. Another approach is to copy and store the portion of the document in another screen different from the screen of the document. However, with this approach, the user switches back and forth between the two screens. Another approach is to bookmark the portion of the document. However, with this approach, the user still should manually bookmark his or her current position in the document in order for the user to go back to the current position.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A, 3B, 3C, 3D and 3E illustrate image representations for referencing a portion of a document according to an embodiment of the disclosure.

DETAILED DESCRIPTION

Embodiments of the disclosure are directed to a method and system for referencing a portion of a document in a computer system. In one embodiment, a document reference module detects a portion of a document selected by a user as the user reads or views the document on the user device. The document reference module stores each selected portion in a data store and also displays each stored selected portion as an icon on the user device. As the user continues to read or view the document, the user may reference to the icon that displays the selected portion of the document. The document reference module detects the reference and provides the referenced selected portion of the document associated with the icon to the user. In one embodiment, the referenced selection portion of the document associated with the icon is displayed on the document of the user device.

A method of one embodiment of the disclosure includes identifying of a user device, a portion of a document such that the portion is selected by a user of the user device. The method also includes displaying the selected portion of the document as a graphical representation of an icon on the user device. The method also includes detecting a reference to the icon displaying the selected portion of the document such that the reference is performed by the user. The method further includes providing the referenced selected portion of the document associated with the icon to the user.

Figure 1:
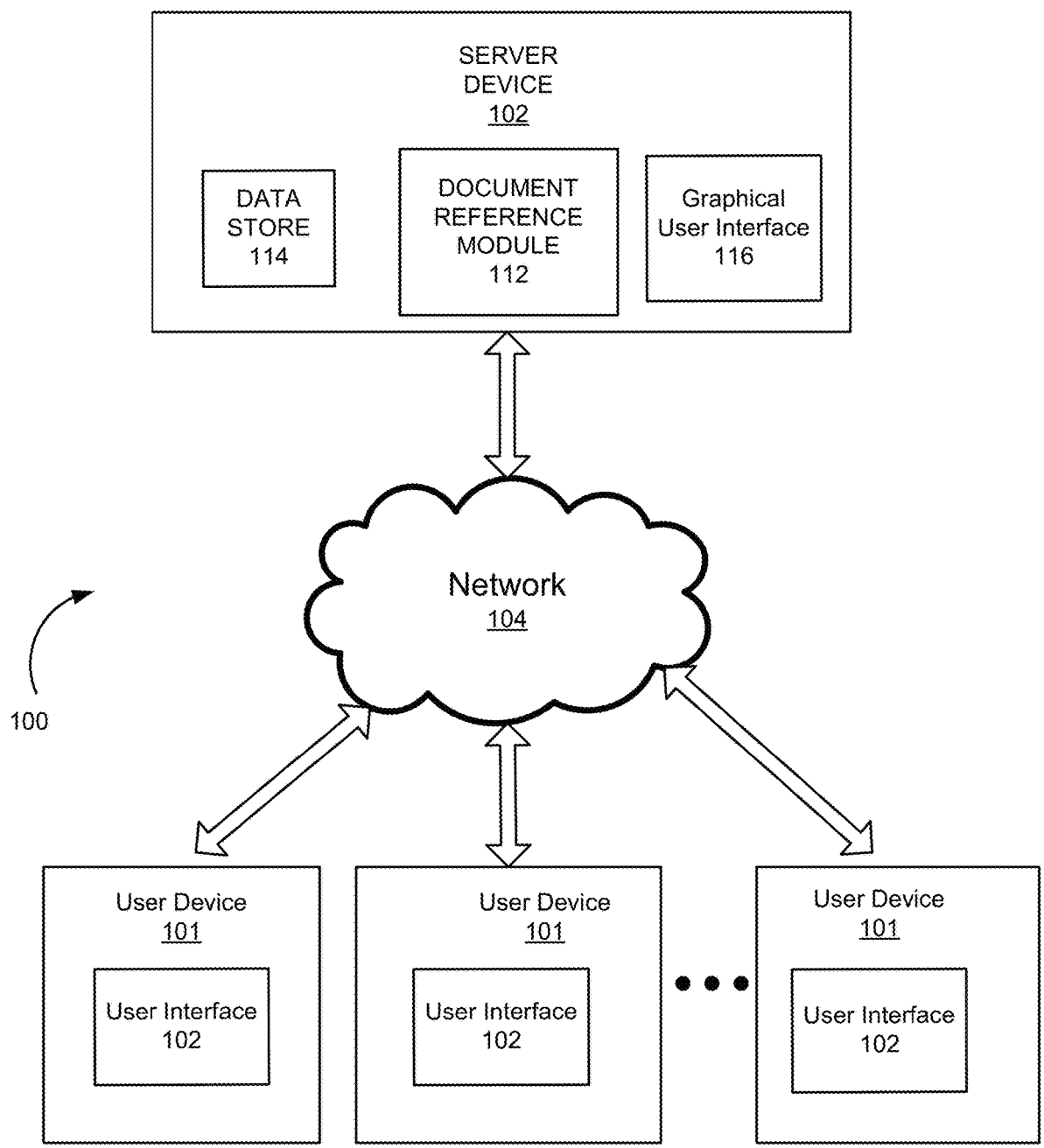
FIG. 1 is a block diagram of a computer system in which the embodiments of the disclosure may operate.

FIG. 1 is a block diagram that illustrates a network architecture 100 in which embodiments of the disclosure may operate. Network architecture 100 includes one or more user devices 101 ("user") and a server device ("server") 120. The user device 101 may be any variety of different computing devices which include but are not limited to, a laptop computer, a handheld computer, a netbook, a desktop, a workstation, a mobile device such as smart phone, a server device, a tablet computing device, or any other type of computing device. Network architecture 100 may include any number of user devices 101 that communicate over the network 104 with any number of servers 120.

A single sever 120 is illustrated and described for sake of clarity; however embodiments of the disclosure are not limited to such a depiction. Network 104 may be any type of communication network including, but not limited to, a local area network (LAN), a wide area network (WAN) (e.g., the Internet) or similar communications network. The network 104 can include any number of network devices and computing devices that are in communication over any combination of wired and wireless communication lines.

In one embodiment, an end user of user device 101 selects a portion of a document. In one embodiment, a document is a type of file produced or edited by an application. An application may include, but is not limited to applications from Microsoft Office such as Microsoft Word, applications from OpenOffice.org (LibreOffice) such as Writer, and any application for displaying documents such as PDF viewers (Acrobat Reader), HTML viewers (web browsers including Firefox, Internet Explorer, Chromium and Opera). The document may include, but is not limited to, text, graphics, charts, and/or other objects.

The server device 120 ("server") may be any type of computing device including a network server device, a plurality of server devices, or other similar computing devices. The network architecture 100 may include any number of servers 120 that communicate over the network 104 with any number of user devices 101. The server 120 may host a document reference module 112, a data store 114 and a graphical user interface (GUI) 116. The document reference module 112 may reference a portion of a document, where the portion is selected by an end user of the user device 101.

In some embodiments, the document reference module 112 of the server device 120 generates a plurality of icons. An icon is a graphic symbol that represents a specific file, directory, window, option or a program. The document reference module 112 may display the plurality of the icons on the user device 101. In some embodiment, the icons are transparently displayed on the user device 101. In one embodiment, the icons are displayed transparently on top of the document. In another embodiment, the icons are displayed on a side area of the user device 101 in order to prevent any obstruction of a view of any content in the document. In one embodiment, the side area is within a window of the document. In another embodiment, the side area is another window separate from the window of the document. The document reference module 112 may display the icons via the GUI 116.

In one embodiment, the user device 101 executes a set of applications (not shown). A 'set,' as used herein, refers to any positive whole number of items including a single item.

The applications may be any computer-executable programs capable of communicating with the server device 120. In one embodiment, the application is a user interface (UI) 102. Some of the UIs may include, but are not limited to, graphical user interface, web-based user interface and touch screen, etc.

In some embodiments, the end user of the user device 101 selects a portion of the document by executing the UI 102 to perform an action on the portion of the document. In one embodiment, the action includes, but is not limited to, a drag via a mouse, a click via the mouse, place a cursor, a click via the mouse, an end user touch on a touch screen, and instructions inputted via a keyboard.

In some embodiments, the document reference module 112 identifies the portion of the document selected by the end user of user device 101. In one embodiment, the document reference module 112 identifies the selected portion when the user drags a mouse onto the portion of the document. As such, instead of placing the selected portion into a clipboard, the selected portion is stored as a reference. The document reference module 112 then may store the selected portion of the document in the data store 114. In another embodiment, the document reference module 112 identifies the selected portion when the user places a cursor on top of a caption corresponding to the portion of the document. In one embodiment, a caption corresponding to the selected portion of the document is stored along with the selected portion of the document. In some embodiments, the caption may include, but is not limited to, a Uniform Resource Locator (URL) link, a title, a heading, and so on. In another embodiment, an original location corresponding to the selected portion of the document is stored along with the selected portions of the document. The original location may include, but is not limited to a page number within the document, a line number within the document, a column number within the document, a paragraph number within the document, and so on.

In some embodiments, the document reference module 112 displays the stored selected portion of the document as at least one of a plurality of icons. In one embodiment, the document reference module 112 displays the stored corresponding caption of the selected portion. In other embodiments, the stored corresponding caption is displayed as a thumbnail. In a further embodiment, the document reference module 112 displays the stored corresponding original location of the selected portions. The document reference module 112 may display the stored selected portion, including the corresponding caption and the location, using the GUI 116.

In some embodiments, the document reference module 112 replaces a previously-displayed stored portion of the document in the icon with a currently-stored selected portion of the document upon detecting an action performed by the end user of the user device 101 on the icon. In another embodiment, the document reference module 112 transfers the displayed stored portion of the document from one of the plurality of icons to another one of the plurality of icons upon an action performed by the user on the icons. In some embodiments, the replacing and/or transferring of the displayed stored portions allows the user to organize the icons in accordance with the user. As such, the displayed stored portions in the icons are placed in the order of referenced contents as provided by the user. In one embodiment, the action performed by the end user on the icon includes, but is not limited to, a drag via a mouse on the icon, a click via the mouse on the icon, place a cursor on the icon, an end user touch to a touch screen, and/or entry of instructions via a keyboard.

In some embodiments, the end user of the user device 101 references the selected portion of the document. As part of referencing the selected portion, the user device 101 may execute the UI 102 of user device 101 to perform an action on the icon or icons associated with the selected portion of the document. As discussed above, the action may include, but is not limited to, a drag via a mouse on the icon, a click via the mouse on the icon, place a cursor on the icon, an end user touch via the touch screen, and an entry of instructions via a keyboard.

In other embodiment, the document reference module 112 detects a reference to the icon which displays the selected portion of the document. As discussed above, the reference to the icon is the action performed by the user. As such, upon the action performed by the user, the document reference module 112 detects the reference to the icon. In some embodiments, the document reference module 112 provides the referenced selected portion of the document in the icon to the user. In one embodiment, the document reference module 112 displays the referenced selected portion of the document in the icon on the user device 101. The document reference module 112 may display a background view of the referenced selected portion of the document in the icon. In other embodiments, the document reference module 112 displays a front view of the referenced selected portion of the document in the icon. In yet other embodiments, the document reference module 112 displays the selected portion of the document in the icon on other locations of the user device 101. These other locations may include, but are not limited to, a desktop screen, a window, or a webpage. In other embodiments the document reference module 112 displays the referenced selected portions of the document in the icon using the GUI 116.

Figure 2:
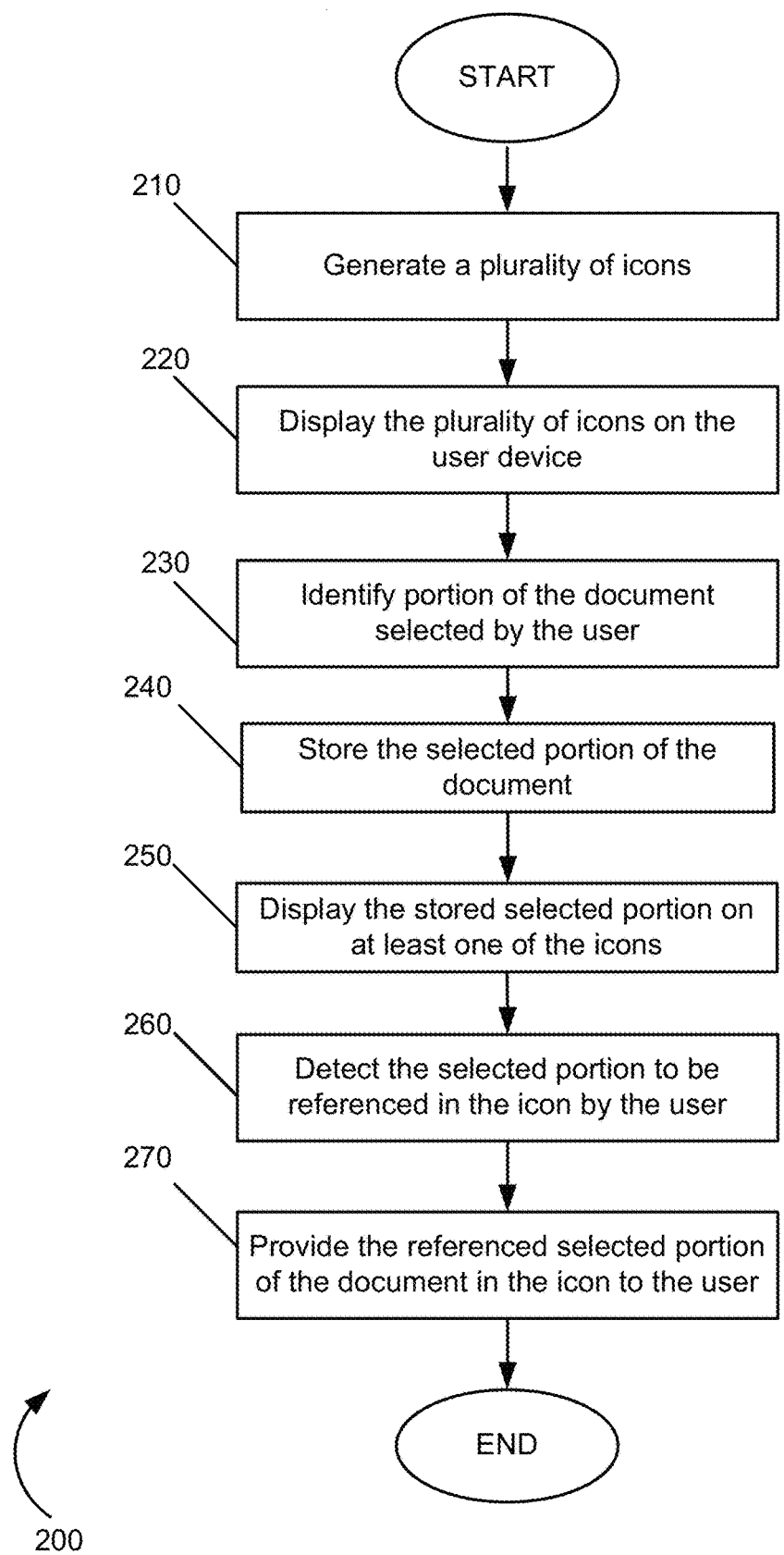
FIG. 2 is a flow diagram of one embodiment of a method for referencing a portion of document.

FIG. 2 is a flow diagram illustrating a method 200 for referencing a portion of a document according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the document reference module 112 of the server device 102 of FIG. 1.

Method 200 begins at block 210 where the document reference module 112 generates a plurality of icons. As discussed above, an icon is a graphic symbol that represents a file, directory, window, option, and/or a program, to name a few examples. At block 220, the document reference module 112 displays the plurality of the icons on the user device 101. In one embodiment, the icons are transparently displayed on the user device 101. In another embodiment, the icons are displayed on a side area of the user device 101 in order to prevent any obstruction of a view of content in the document. In one embodiment, the side area is within a window of the document. In another embodiment, the side area is another window separate from the window of the document. Example screenshots associated with displaying the plurality of icons are described below with respect to FIG. 3A.

Figure 3B:
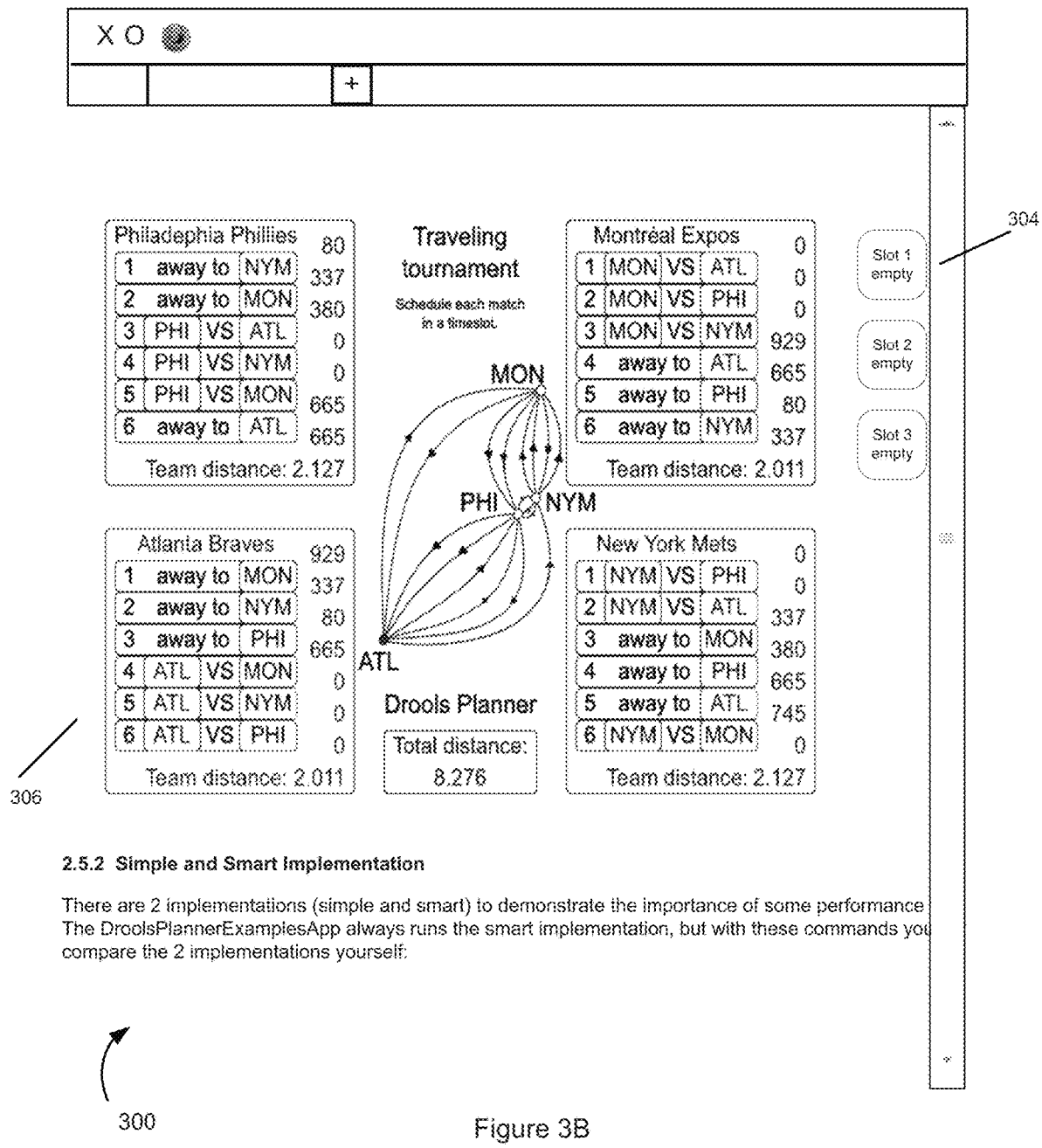

FIGS. 3A-3E are screenshots illustrate examples of images representing a document being viewed or read by a user on the user device 101, according to embodiments of the disclosure. FIG. 3A shows an image of a document 300 including a part of the document 302 being viewed or read by the document and three icons 304 displayed on a user device, such as user device 101 of FIG. 1. Embodiments of the disclosure are not limited to three icons and may include less or more than three icons. As illustrated, icons 304 are minimized and transparently displayed on the upper right side of the user device. In other embodiments, the icons may be displayed in a different fashion, such as opaquely, and on any area on the user device, as long as the icons do not obstruct a view of content in the document.

Referring back to FIG. 2, at block 230, the document reference module 112 identifies a portion of the document selected by an end user of the user device 101. As discussed above, the document may include, but is not limited to, text, graphics, charts, and/or other objects. In one embodiment, the document reference module 112 identifies the selected portion of the document upon performance of an action by the end user on the portion of the document. As discussed above, the action includes, but is not limited to, a drag via a mouse, a click via the mouse, place a cursor, a click via the mouse, an end user touch via a touch screen, and/or an entry of instructions via a keyboard. In one embodiment, the document reference module 112 identifies the selected portion when the user drags a mouse onto the portion of the document. As such, instead of placing the selected portion into a clipboard, the selected portion is stored as a reference. In another embodiment, the document reference module 112 identifies the selected portion when the user places a cursor on top of a caption corresponding to the portion of the document.

FIG. 3B is a screenshot illustrating one example of a selected portion of a document being identified upon performance of an end user action on the portion of the document. Assume that an end user selects diagram 306 of the part of the document 302. For example, the end user may click on the diagram 306 or highlight the diagram 306. In one embodiment, once the selected portion (e.g., diagram 306) is identified, the three icons 304 associated with the part document 302 expand from a minimized depiction to a maximized depiction that illustrates the specific content on the icons 304. The three icons 304 displayed in FIG. 3B do not include any content; however, in other embodiments of the disclosure the icons may include content of a portion of the document that was previously selected by the user.

At block 240, the document reference module 112 stores the selected portion of the document in the data store 114. In one embodiment, a caption corresponding to the selected portion of the document is stored along with the selected portions of the document. In some embodiments, the caption may include, but is not limited to, a URL link, a title if the document, a heading of the document, etc. In another embodiment, an original location corresponding to the selected portions of the document is stored along with the selected portions of the document. The original location may include, but is not limited to, a page number of the selected portion in the document, a line number of the selected portion in the document, a column number of the selected portion in the document, a paragraph number of the selected portion in the document, etc.

At block 250, the document reference module 112 displays the stored selected portion as at least one of the plurality of icons. In one embodiment, the document reference module 112 displays the stored corresponding caption of the selected portion. For example, the stored corresponding caption may be displayed as a thumbnail. In another embodiment, the document reference module 112 displays the stored original location of the selected portions as the icon. For example, the stored original location may be displayed as a thumbnail. In other embodiments, the document reference module 112 displays the stored selected portion, including the corresponding caption and the location, using the GUI 116.

In some embodiments, the document reference module 112 replaces a previously displayed stored portion of the document in the icon by a currently stored selected portion of the document upon an action performed by the end user on the icon. In other embodiments, the document reference module 112 transfers the displayed stored portion of the document from one of the plurality of icons to another one of the plurality of icons upon the action performed by the end user on the icons. In some embodiments, the replacing and/or transferring of the displayed stored portions allows the user to organize the icons in accordance with the user. As such, the displayed stored portions in the icons are placed in the order of referenced contents as provided by the user.

Figure 3C:
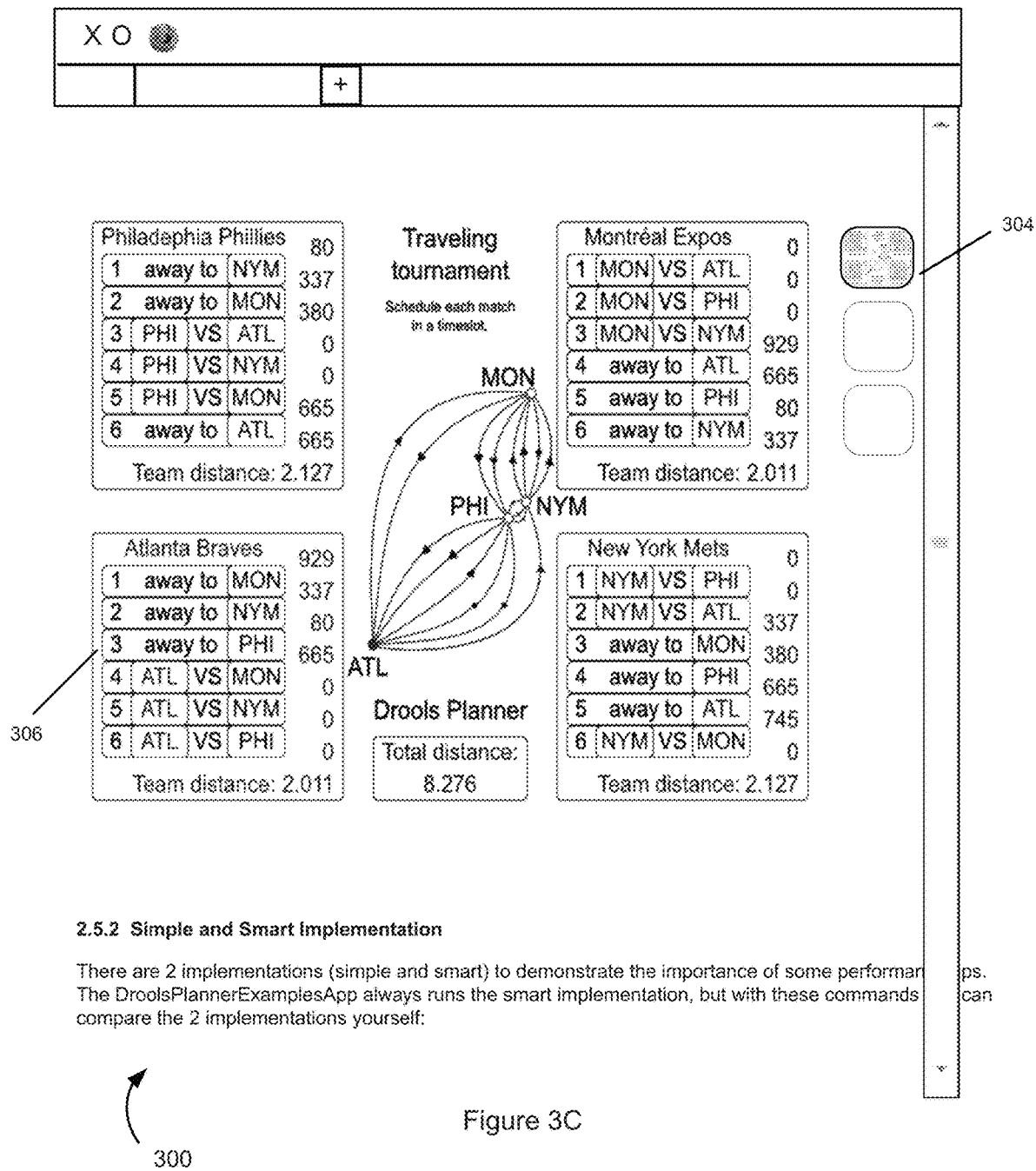

FIG. 3C depicts a screenshot illustrating one example of a selected portion of the part of the document 302, namely diagram 306, displayed as one of the icons 304 according to an embodiment of the disclosure. As illustrated, icons 304 are minimized subsequent to the display of the selected portion (i.e., diagram 306) in one of the icons 304. This minimization is similar to the original configuration of icons 304 depicted in FIG. 3A. However, in contrast to FIG. 3A, the icon associated with the selected portion of diagram 306 is no longer empty and includes the graphic depiction of diagram 306 that was selected by the end user.

Referring back to FIG. 2, at block 260, the document reference module 112 detects a reference to the icon which displays the selected portion of the document. In one embodiment, the reference to the icon is an action performed by the user. As discussed above, the action includes, but is not limited to, drag via a mouse on the icon, a click via the mouse on the icon, place a cursor on the icon, click on the icon via a mouse, touch on the icon via user's finger, instructions on the icon via a keyboard. As such, upon the action performed by the user, the document reference module 112 detects the reference to the icon.

Figure 3D:
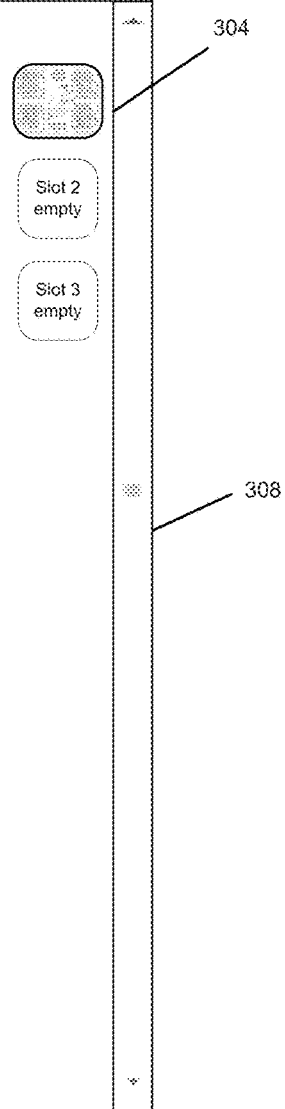
Figure 3D:

FIG. 3D illustrates an image of a different part 308 of the document 300 than previously viewed by the user. At this different part 308 of the document, the user may wish to reference the diagram 306 that is associated with one of the icons 304. To accomplish this, the end user may select the icon 304 associated with the diagram 306 by selecting the icon 304 or performing another action on the icon 304. The document processing module 112 detects the end user's action performed on the icon 304 and, in turn, maximizes the icon 304 for the end user's viewing purposes.

Referring back to FIG. 2, at block 270, the document reference module 112 provides the referenced selected portion of the document associated with the icon to the end user. In one embodiment, the document reference module 112 displays a background view of the referenced selected portion of the document associated with the icon. In other embodiments, the document reference module 112 displays the referenced selected portion of the document associated with the icon in front of the document. In yet other embodiments, the document reference module 112 displays the referenced selected portion of the document associated with the icon at another location of the user device 101. For example, the other location may include, but is not limited to, a desktop screen, another window, a webpage, and so on.

Figure 3E:
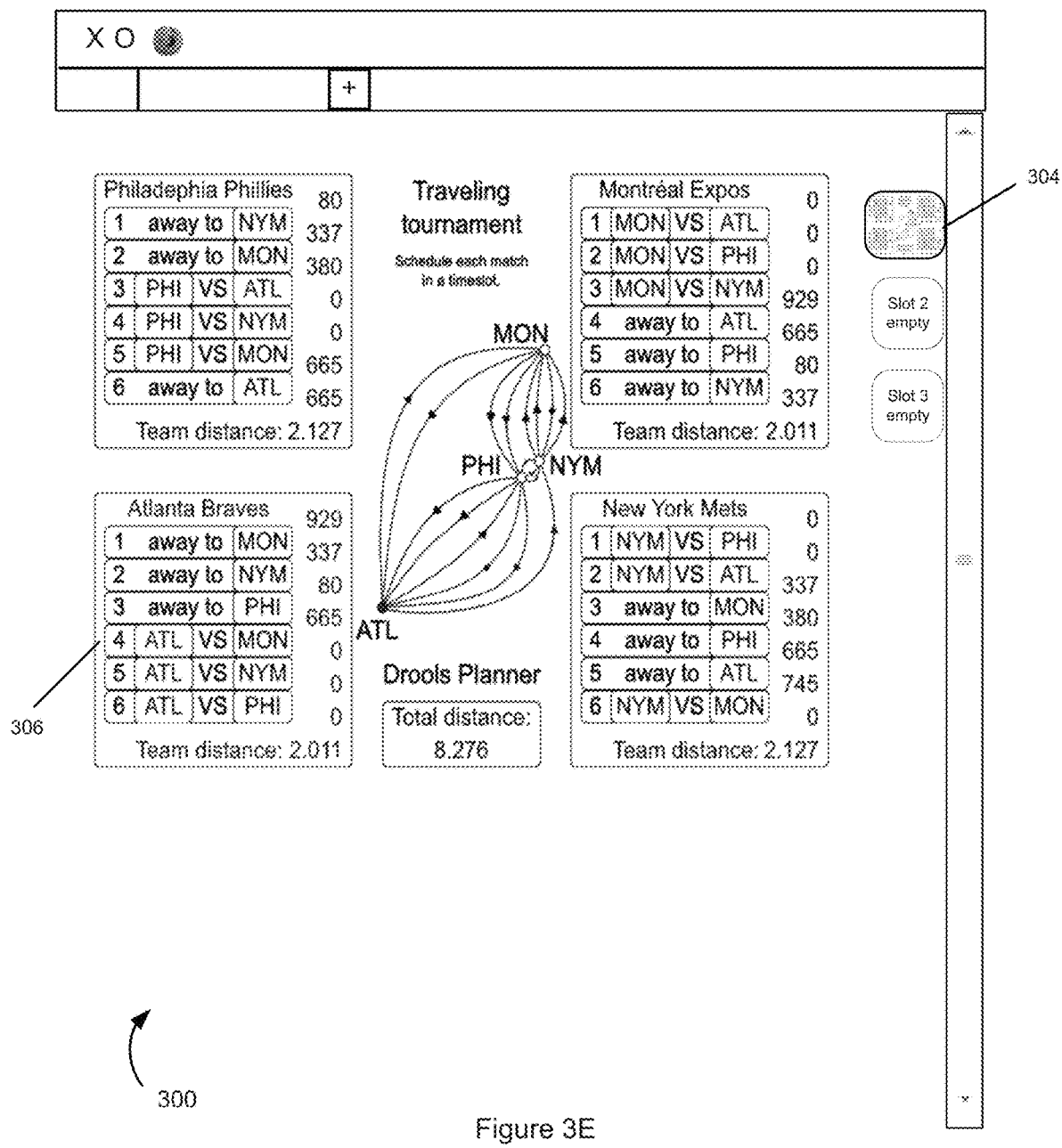

FIG. 3E illustrates the diagram 306 displayed on the user device subsequent to a user selecting the icon 304 to view the selected portion (i.e., diagram 306) of the document 300. In the example, the diagram 306 is displayed in front of the document 300. As illustrated, the diagram 306 may be transparently overlaid on top of the document 300 display in a same window of the document 300. Other presentations of the selected portion of the document associated with the icon may also be implemented in embodiments of the disclosure.

Figure 4:
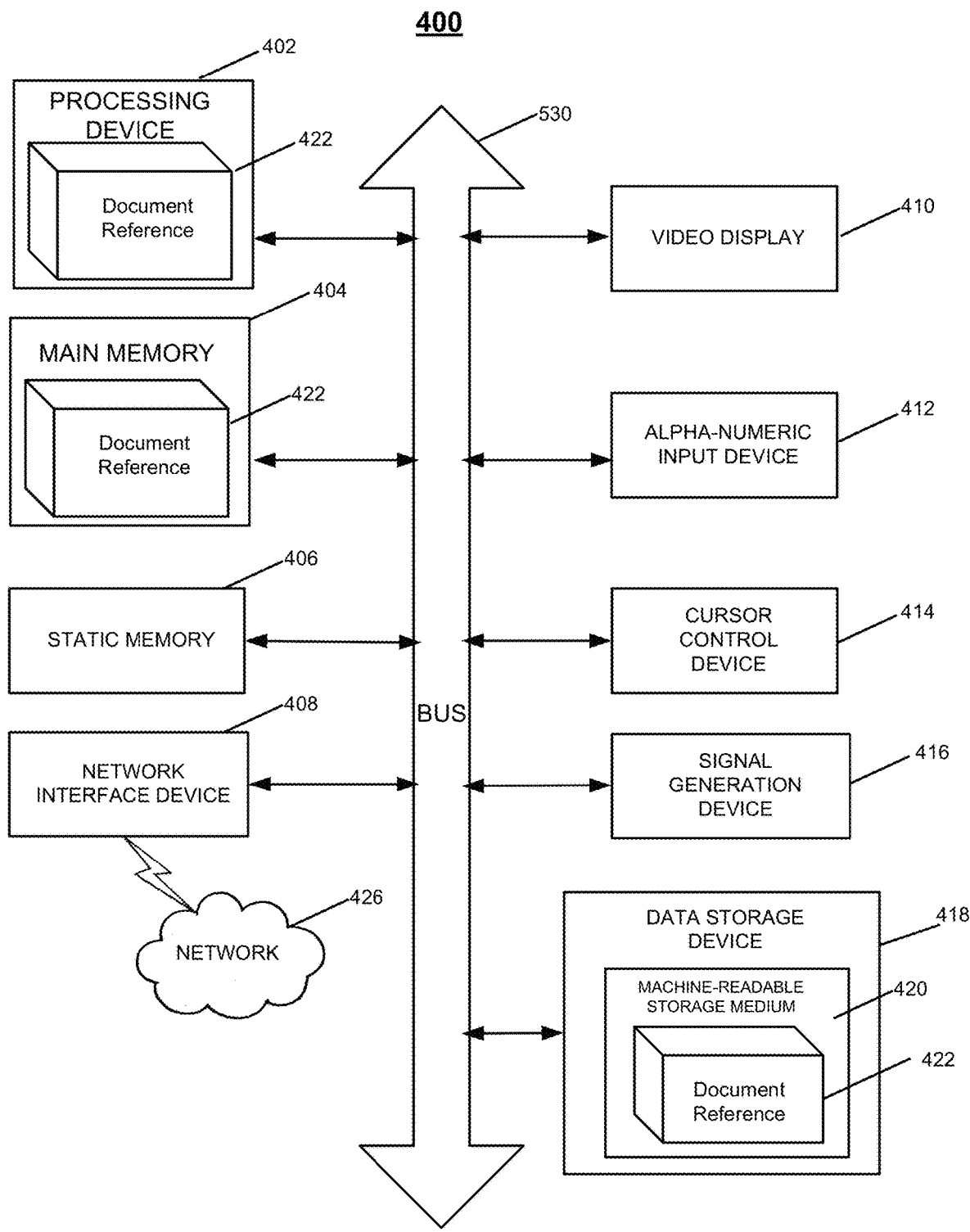
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute document reference processing logic 422 for performing the operations and steps discussed herein. In one embodiment, document reference module 112 described with respect to FIG. 1 performs the document reference processing logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. document reference processing logic 422) embodying any one or more of the methodologies of functions described herein, such as method 200 for referencing a portion of the document described with respect to FIG. 2. The document reference processing logic 422 may also reside, completely or at least partially, within the memory 406 and/or within the processing device 402 during execution thereof by the computer system 400; the memory 406 and the processing device 402 also constituting machine-accessible storage media. In one embodiment, the document reference processing logic 422 may be implemented by document reference module 112 described with respect to FIG. 1.

The machine-readable storage medium 420 may also be used to store the document reference processing logic 422 persistently containing methods that call the above applications. While the machine-readable storage medium 420 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but is not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'detecting", "determining", "storing", "inserting", 'identifying", "recognizing", "providing", "rendering", "displaying" "generating" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device, a user selection of a portion of first document content that is displayed in a window of a graphical user interface (GUI) of a user device, wherein the first document content is part of a document;
   displaying, at the GUI by the processing device, in a side area of the window of the GUI an icon that references the user-selected portion of the first document content;
   displaying, by the processing device, second document content of the document responsive to receiving a first GUI command to scroll from the first document content to the second document content, wherein the icon is displayed in the side area of the window concurrently with the display of the first document content at the window and displayed in the side area of the window concurrently with the display of the second document content at the window;
   detecting, by the processing device, a reference to the icon that is displayed concurrently with the second document content of the document at the window of the GUI; and
   responsive to the detecting the reference to the icon that is displayed concurrently with the second document content of the document at the window of the GUI, displaying, by the processing device, the user-selected portion of the first document content concurrently with the second document content of the document at the window.

2. The method of claim 1, wherein displaying the user-selected portion of the first document content concurrently with the second document content of the document at the window further comprises displaying the user-selected portion of the first document content as an overlay on the second document content of the document at the window, wherein the overlay of the user-selected portion of the first document content is at least partially transparent to cause a presentation of at least a portion of the second document content that is behind the overlay of the user-selected portion of the first document content.

3. The method of claim 1, wherein displaying the icon that references the user-selected portion of the first document content, further comprises displaying the icon and the first document content of the document concurrently at the window of the GUI.

4. The method of claim 1, wherein the reference to the icon is detected in view of an action executed on the icon.

5. The method of claim 1, further comprising storing, by the processing device, the user-selected portion of the first document content of the document at a data store.

6. The method of claim 5, further comprising:
   storing a caption corresponding to the user-selected portion of the first document content with the stored user-selected portion of the first document content of the document, wherein the caption comprises at least one of a uniform resource locator (URL) of the document, a link to the document, a title of the document, or a heading of the document; and
   displaying the stored caption with the stored user-selected portion of the first document content of the document in the icon.

7. The method of claim 5, further comprising:
   storing a location of the user-selected portion of the first document content with the stored user-selected portion of the first document content of the document at the data store, wherein the location comprises at least one of a page number of the user-selected portion of the first document content in the document, a line number of the user-selected portion of the first document content in the document, a column number of the user-selected portion of the first document content in the document, or a paragraph number of the user-selected portion of the first document content in the document; and
   displaying the stored location with the stored user-selected portion of the first document content of the document in the icon.

8. A system comprising:
   a memory; and
   a processing device, operatively coupled to the memory, to:
   receive, by the processing device, a user selection of a portion of first document content that is displayed in a window of a graphical user interface (GUI) of a user device, wherein the first document content is part of a document;

display, at the GUI, in a side area of the window of the GUI an icon that references the user-selected portion of the first document content;

display second document content of the document responsive to receiving a first GUI command to scroll from the first document content to the second document content, wherein the icon is displayed in the side area of the window concurrently with the display of the first document content at the window and displayed in the side area of the window concurrently with the display of the second document content at the window;

detect a reference to the icon that is displayed concurrently with the second document content of the document at the window of the GUI; and responsive to the detecting the reference to the icon that is displayed concurrently with the second document content of the document at the window of the GUI, display the user-selected portion of the first document content concurrently with the second document content of the document at the window.

9. The system of claim 8, wherein to display the user-selected portion of the first document content concurrently with the second document content of the document at the window, the processing device further to display the user-selected portion of the first document content as an overlay on the second document content of the document in the window, wherein the overlay of the user-selected portion of the first document content is at least partially transparent to cause a presentation of at least a portion of the second document content that is behind the overlay of the user-selected portion of the first document content.

10. The system of claim 8, wherein to display the icon that references the user-selected portion of the first document content, the processing device further to display the icon and the first document of the document concurrently at the window of the GUI.

11. The system of claim 8, wherein the reference to the icon is determined in view of an action executed on the icon.

12. The system of claim 8, wherein the processing device is to:
store the user-selected portion of the first document content of the document at a data store;
store a caption corresponding to the user-selected portion of the first document content with the stored user-selected portion of the first document content of the document, wherein the caption comprises at least one of a uniform resource locator (URL) of the document a link to the document, a title of the document, or a heading of the document; and
display the stored caption with the stored user-selected portion of the first document content of the document in the icon.

13. The system of claim 12, wherein the processing device is to:
store a location of the user-selected portion of the first document content with the stored user-selected portion of the first documents content of the document at the data store, wherein the location comprises at least one of a page number of the user-selected portion of the first document content in the document, a line number of the user-selected portion of the first document content in the document, a column number of the user-selected portion of the first document content in the document, or a paragraph number of the user-selected portion of the first document content in the document; and display the stored location with the stored user-selected portion of the first document content of the document in the icon.

14. A non-transitory machine-readable storage medium comprising instructions that, responsive execution by a processing device, cause the processing device to:
receive, by the processing device, a user selection of a portion of first document content that is displayed in a window of a graphical user interface (GUI) of a user device, wherein the first document content is part of a document;
display, by the processing device at the GUI, in a side area of the window of the GUI the an icon that references the user-selected portion of the first document content;
display, by the processing device, second document content of the document responsive to receiving a first GUI command to scroll from the first document content to the second document content, wherein the icon is displayed in the side area of the window concurrently with the display of the first document content at the window and displayed in the side area of the window concurrently with the display of the second document content at the window;
detect, by the processing device, a reference to the icon that is displayed concurrently with the second document content of the document at the window of the GUI; and
responsive to the detecting the reference to the icon that is displayed concurrently with the second document content of the document at the window of the GUI, display, by the processing device, the user-selected portion of the first document content concurrently with the second document content of the document at the window.

15. The non-transitory machine-readable storage medium of claim 14, wherein to display the user-selected portion of the first document content concurrently with the second document content of the document at the window of the GUI, the processing device further to display the user-selected portion of the first document content as an overlay on the second document content of the document at the window, wherein the overlay of the user-selected portion of the first document content is at least partially transparent to cause a presentation of at least a portion of the second document content that is behind the overlay of the user-selected portion of the first document content.

16. The non-transitory machine-readable storage medium of claim 14, wherein to display the icon that references the user-selected portion of the first documents content, the processing device further to display the icon and the first document content of the document concurrently at the window of the GUI.

17. The non-transitory machine-readable storage medium of claim 14, wherein the reference to the icon is detected in view of an action executed on the icon.

18. The non-transitory machine-readable storage medium of claim 14, wherein the processing device is further to store the user-selected portion of the first document content of the document at a data store.

19. The non-transitory machine-readable storage medium of claim 18, wherein the processing device is further to:
store a caption corresponding to the first user-selected portion of the first document content with the stored user-selected portion of the first document content of the document, wherein the caption comprises at least one of a uniform resource locator (URL) of the document a link to the document, a title of the document, or a heading of the document; and display the stored caption with the stored user-selected portion of the first document content of the document in the icon.

20. The non-transitory machine-readable storage medium of claim 18, wherein the processing device is to:

store a location of the user-selected portion of the first document content with the stored user-selected portion of the first document content of the document at the data store, wherein the location comprises at least one of a page number of the user-selected portion of the first document content in the document, a line number of the user-selected portion of the first document content in the document, a column number of the user-selected portion of the first document content in the document, or a paragraph number of the user-selected portion of the first document content in the document; and display the stored location with the stored user-selected portion of the first document content of the document in the icon.

\* \* \* \* \*